Nov. 11, 1958  E. R. GLENN  2,859,741
FUEL INJECTING APPARATUS
Filed Sept. 20, 1956   5 Sheets-Sheet 2

INVENTOR.
Edward R. Glenn
BY
George A. Maxwell
Agent

Nov. 11, 1958  E. R. GLENN  2,859,741
FUEL INJECTING APPARATUS
Filed Sept. 20, 1956  5 Sheets-Sheet 3

INVENTOR.
Edward R. Glenn
BY
George A. Maxwell
Agent

Nov. 11, 1958 E. R. GLENN 2,859,741
FUEL INJECTING APPARATUS
Filed Sept. 20, 1956 5 Sheets-Sheet 5

INVENTOR.
Edward R. Glenn
BY
George C. Maxwell
Agent

United States Patent Office 2,859,741
Patented Nov. 11, 1958

2,859,741

FUEL INJECTING APPARATUS

Edward R. Glenn, Pasadena, Calif.

Application September 20, 1956, Serial No. 611,006

6 Claims. (Cl. 123—119)

This invention relates to a fuel injecting apparatus and is more particularly concerned with a novel apparatus adapted to be applied to and to inject fuel into a gasoline operated internal combustion engine.

An object of the present invention is to provide a fuel injecting apparatus applicable to an internal combustion engine having a plurality of cylinders and including an electrically operated injector pump unit related to each cylinder, fuel supply means delivering fuel to each of the injector pumps and an electric distributor driven by the engine and adapted to deliver current to each of the pump units each time the cylinder to which it is related is to be charged with fuel.

Another object of the present invention is to provide an apparatus of the character referred to adapted to be related to the air intake manifold of an internal combustion engine, which manifold is provided with a throttle valve adapted to control the volume of air drawn into the engine and the speed of the engine.

It is a further object of this invention to provide an apparatus as set forth above wherein each pump unit is provided with a metering valve and means operatively relating the metering valve of the several pump units with the throttle valve.

A further object of my invention is to provide an apparatus as set forth above wherein each injector pump unit is provided with a solenoid operated pump means which includes a stationary piston, a cylinder block shiftably related to the piston and an electrical winding fixed to the piston and adapted to shift the cylinder block relative to the piston when energized.

An object of the present invention is to provide a distributor to energize the windings of the several pumps and which is adapted to be related to a stock ignition distributor of the engine to which the apparatus is related.

A general object of my invention is to provide an apparatus of the character referred to that can be advantageously applied to the intake manifold and the distributor of a conventional internal combustion engine with slight modification.

The various objects and features of my invention will be fully understood from the following detailed description of a typical preferred form and application of my invention, throughout which description reference is made to the accompanying drawings, in which.

Figure 1:
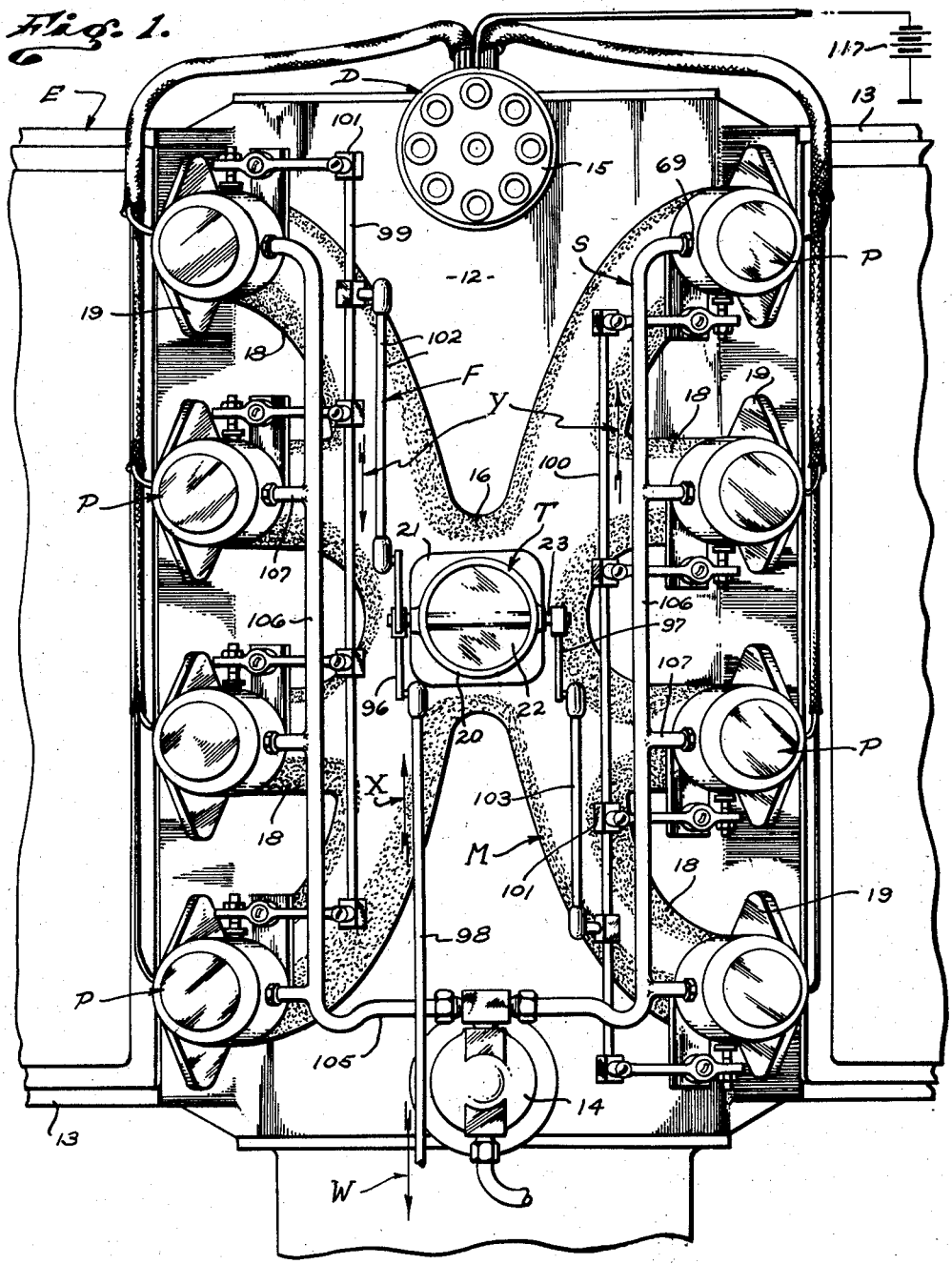
Fig. 1 is an elevational plan view of a portion of an internal combustion engine and showing the apparatus provided by the present invention applied thereto.
Figure 2:
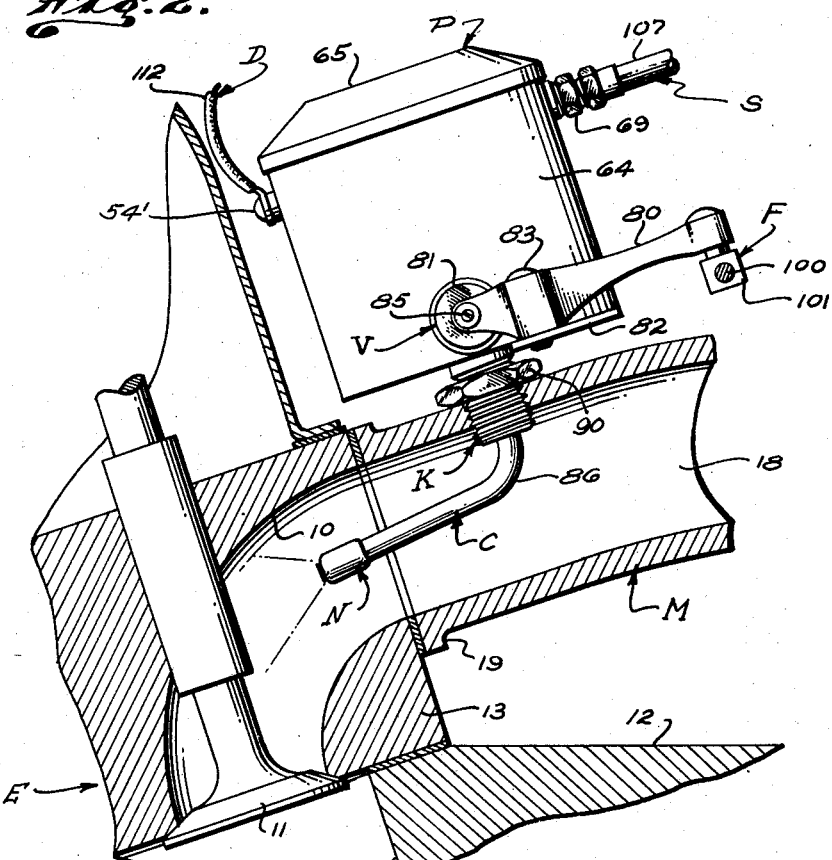
Fig. 2 is a full-size sectional view of a portion of the internal combustion engine and showing an injector pump as applied thereto.

In Fig. 1 of the drawings and for the purpose of illustration, I have shown my apparatus applied to an eight cylinder V-type engine having an elongate cylinder block 12 with two laterally spaced rows or banks of cylinders, a pair of cylinder heads 13 fixed to the block and closing the upper ends of the cylinders. The intake ports 10 (see Fig. 2) for the cylinders are shown as being located or established in the heads 13 and the intake valves 11 are shown carried by the heads. The valves 11 are operated or opened and closed by conventional valve actuating means (not shown).

In addition to the above, the engine E illustrated in Fig. 1 of the drawings is shown as being provided with a conventional gasoline pump 14, which pump is operated by parts of the engine (not illustrated), and a conventional ignition distributor 15 timed with and driven by parts of the engine (not illustrated) and adapted to deliver current to spark plugs or the like each time a cylinder is charged and readied for firing.

It is to be understood that the engine E illustrated throughout the drawings is for the purpose of illustration only and that in practice, the details of construction, arrangement of parts and design can vary widely without in any way affecting the operation of the apparatus provided by the present invention.

The apparatus provided by the present invention is adapted to be applied or related to a conventional gasoline operated internal combustion engine E to inject fuel into the intake ports 10 thereof each time the intake valves 11 open to pass a charge of air and gasoline into the cylinders 12a. The apparatus includes generally, an air intake manifold M engageable with the engine E to communicate with and conduct air into the intake ports 10, a throttle valve T controlling the flow of air into the manifold M, a solenoid operated injector pump unit P for each cylinder 12a and adapted to inject a shot of gasoline or fuel into the intake port related to the cylinder each time the intake valve 11 is opened, a distributor means D timed with the engine E and adapted to direct current to and actuate the pumps P, fuel supply means S adapted to supply each of the pumps P with gasoline and manually operable control means F related to the throttle valve T and the several pumps P and adapted to control the rate and flow of air and gasoline into the engine E.

The air intake manifold M is shown as including a central body portion 16 with an air inlet opening and a plurality of ducts 18 extending between and establishing open communication with the inlet port 10 in the engine and the said body portion. The several ducts 18 are provided with suitable mounting flanges 19 at their ends where they engage the heads 13 of the engine E.

In cases where the apparatus that I provide is applied to an existing engine having a conventional carburetor and intake manifold setup, the fuel supply to the carburetor can be shut off and the existing throttle valve in the carburetor, adapted to control the flow of air into the manifold, can be employed, thereby eliminating the necessity of providing a special throttle valve. In the case illustrated, I have shown a special throttle valve T engaged on the manifold M and including a tubular body 20, a mounting flange 21, a butterfly type valve member 22 within the body and a mounting shaft 23 carrying the member 22 and pivotally engaged in and projecting from the opposite sides of the body 20.

The solenoid operated injector pump unit P related to each cylinder 12a and adapted to deliver or inject a shot of fuel or gasoline into the intake port 10 for the cylinder each time the intake valve 11 is open, is a unitary mechanism and involves generally, a pump means A, a drive means B adapted to operate the pump A, and metering valve means V to control the quantity of fuel delivered by the pump. Each pump unit P further includes a suitable mounting means K to secure the unit to the exterior of the engine E, a fuel conducting means C adapted to project into the intake port of the engine and a pressure actuated nozzle N carried by the means C to occur within the intake port 10 adjacent the valve 11.

Each injector unit P is shown as including a flat horizontally disposed disc-shaped base plate 30 having a central vertical opening 31 therein, an elongate vertically disposed body 32 press fitted into the opening 31 in the base plate and having an upper portion 33 projecting upwardly from the base plate to establish a piston for the pump means A, a central portion 34 within the base plate and adapted to cooperate with and establish a part of the metering valve means V and a lower portion 35 depending from the base plate and establishing the mounting means K and connected with and carrying the fuel conducting means C. The unit further includes an elongate vertically disposed cylinder block 36 positioned above the body 32 and having a downwardly opening socket 37 and a laterally opening fuel intake passage 38 establishing communication with the bottom of the socket, a disc-shaped cylinder head 39 seated in the bottom of the socket, and an elongate vertically disposed cylinder sleeve 40 press fitted into the socket to engage and seal with the head therein and projecting downwardly from the lower end of the socket to slidably engage around the upper end portion 33 of the body which I will hereinafter refer to as the piston. The head 39 at the bottom of the socket 37 and closing the upper end of the cylinder sleeve 40 is provided with a suitable intake valve 41 adapted to permit flow of gasoline or fuel from the fuel intake passage 38 into the cylinder 40 and to check reverse flow of fuel therebetween when the unit is actuated. In the form of the invention illustrated, the valve 41 is a simple spring loaded poppet valve engaged in a suitable port 42 in the head 39.

The body 32 is provided with a substantially longitudinally disposed discharge passage 43 extending from the upper piston portion 33 to the central portion 34 of the body to conduct fuel from within the cylinder 40 to the metering valve means V. An outlet valve 44 is provided at the upper end of the piston 33 to normally prevent the flow of fuel from the cylinder 40 into the passage 43, but is adapted to open when the unit is actuated. In the form of the invention illustrated, the outlet valve 44 is shown as including a seat ring 45 engaged in a socket 46 entering the top of the piston 33, a counterbore 47 extending down from the bottom of the socket and connected with the passage 43, a ball 48 in the counterbore, and a compression spring 49 below the ball and normally yieldingly urging it upwardly into sealing engagement with the seat.

In the form of the invention illustrated, I have shown the piston 33 provided with a pair of vertically spaced annular grooves 50 about its exterior, and suitable sealing rings 51 in the grooves and sealing with the interior of the cylinder sleeve 40 in which the piston is engaged.

The drive means B adapted to operate the pump means A, that is, to shift the cylinder block 36 and the cylinder sleeve 40 downwardly relative to the piston 33 and to force the fuel entered into the cylinder through the inlet valve 41, passed the outlet valve 44 and through the passage 43 to the metering valve means V, is shown as including a cylindrical mandrel 52 adjacent the top of the base plate 30 and having a central bore 53 through which the body 32 extends, and a coil or winding 54 engaged around and carried by the mandrel. The mandrel 52 is of limited vertical extent and terminates below the upper end of the piston 33. The coil or winding 54 is coextensive with the mandrel and has an upper portion projecting upwardly therefrom to occur around the lower end portion of the cylinder block 36 which is preferably formed of iron.

An annular retainer member 55 is provided to hold the upper portion of the coil 54. The retainer member 55 is shown as including a flat horizontally disposed annular top 56 overlying the upper end of the coil and an annular skirt 57 depending from the inner periphery of the top to occur adjacent the inner periphery of said upper portion of the coil and fixed to the mandrel and adapted to freely receive the cylinder block 36.

A suitable contact fitting 54' is provided at one end of the coil to occur at the exterior thereof where it connects with the distributing means D, while the other end of the coil is shown connected or grounded to the mandrel at 54''.

In the form of the invention illustrated, the mandrel 52 is provided with an upwardly opening socket 60 concentric with the opening therein and with the piston and adapted to accommodate the lower end portion of the cylinder 40 when the unit is actuated. A rubber O-ring 61 is provided at the bottom of the socket to be engaged by the cylinder and to act as a silencer and/or snubber.

The pump means A further includes a return spring 62 adapted to urge the cylinder block and cylinder 40 upwardly after the unit has been actuated. In the case illustrated, the spring 62 is shown as an elongate substantially vertically disposed compression spring engaged around the cylinder block and having its upper end engaged in an annular groove 63 about the exterior of the cylinder block and its lower end engaging and acting against the top 56 of the coil retainer.

A suitable housing is provided for the coil and the pump means A. The housing is shown as including an elongate vertically disposed cylindrical jacket 64 fixed to and projecting upwardly from the base plate 30 and a cover 65 engaged on and fixed to the upper end of the jacket to close the jacket and occurring in spaced relationship above the cylinder block 36. A suitable opening 64' is provided in the side of the jacket 64 to receive and support the contact fitting 54' for the coil 54. The cover 65 of the housing serves as a stop for the cylinder block when the block is urged upwardly by the spring 62 and after the unit has been actuated.

In the form of the invention illustrated, a suitable rubber bumper 66 is provided in the upper end of the cylinder block 36. The bumper is adapted to act as a silencer and snubber for the cylinder block 36 when it is urged upwardly by the spring 62 and engages the cover of the housing.

In the form of the invention illustrated and to conduct fuel from the fuel distributing means, at the exterior of the jacket 64 to the relatively shiftable cylinder block 36 within the jacket, I provide a flexible hose 67 extending substantially circumferentially in the annulus between the cylinder block and the jacket, a fitting 68 at one end of the hose and engaged in the lateral intake passage 38 in the cylinder block, and a fitting 69 engaged through and carried by the jacket 64 at a point spaced circumferentially of the opening 38 and adapted to connect with the means S as will hereinafter be described.

The metering valve means V of each injector unit P and adapted to control the quantity of fuel delivered to the engine E through the fuel conducting means C and the nozzle N is shown as including a horizontally disposed bore 70 entering the body from one side to intersect and establish open communication with the fuel conducting passage 43 extending from the upper end of the piston 33, and having an inwardly converging bottom establishing a valve seat 71, a counterbore 72 extending inwardly from the bottom or seat and communicating with the fuel conducting means C, a laterally opening socket 73 in the base plate, a bore 74 concentric with the socket and continuing inwardly from the bottom of the socket 73 to register and communicate with the bore 70 in the body, and a needle valve 75 having an elongate stem 76, entering the socket from the side of the base plate to slidably engage in the bores 70 and 74 and cooperate with the seat 71. The valve means V is shown as further including suitable actuating and adjusting means, which means is shown as including a radially outwardly projecting flange 77 intermediate the ends of the stem 76, to occur within the socket 73, a compression spring 78 engaged around the valve stem to occur between the bottom of the socket and the flange on the stem and normally yieldingly urging the stem outwardly and the valve 75 out of engagement with or away from the seat 71, an adjusting screw 79 threadedly engaged in the socket outward of the flange 77 and having a central opening slidably receiving the outer portion of the valve stem 76 which projects therethrough, and a lever arm 80 pivotally related to the unit and adapted to connect with the manually operable control means F and to engage the outer end of the valve stem 76.

A suitable sealing means is provided about the valve stem 76 to prevent the passage of gasoline outwardly therealong. In the case illustrated, the sealing means is shown as including an O-ring engaged in the bottom of the socket 73 and around the stem and an annular follower ring between the O-ring and the spring 78. With the above relationship of parts, it will be apparent that the O-ring is yieldingly maintained in sealing engagement with the bottom of the socket and around the stem by the spring 78.

The adjusting screw 79 engaged in the socket 73 in the base plate 30 is provided with a hand or tool engaging head 81 and is adapted to be shifted longitudinally in the socket to engage the flange on the stem and to limit or control the outward movement of the valve stem and the relative positioning of the valve 75 to the seat 71 when the valve means is fully open.

The lever arm 80 is a simple straight elongate member and is shown pivotally connected to a support bracket 82 carried by the base plate 30 by means of a suitable pivot pin 83 engaged through the arm at a point intermediate its ends. The lever arm 80 is arranged so that one end thereof overlies the outer end of the valve stem 76 and so that its other end projects laterally from the unit where it can be advantageously connected to the manually operable control means F which means is related to the several units P and to the throttle valve T.

The lever arm 80 is adapted to normally engage the outer end of the valve stem 76 to urge the valve 75 towards the seat 71, as when the engine E is stopped or is idling. In practice, it is not desired to completely shut off the flow of fuel through the valve means V but to simply restrict or limit the flow of fuel so that a proper amount of fuel will be passed in order that the engine will properly idle. In order that the proper quantity of fuel is passed by the valve means V when the engine is idling, I provide an idling screw 85 in the end of the arm 80 adjacent the valve 76, which screw engages the outer end of the stem. It will be apparent that by simple adjustment of the screw 85, the inward movement of the needle valve 75 towards the valve seat 71, when the control means F connected to the arm is unactuated, can be easily and accurately controlled.

The fuel conducting means C is shown as including a fuel discharge tube 86 fixed to and depending from the lower terminal end of the body 32 and a discharge duct 87 extending through the lower portion of the body and establishing open communication between the counterbore 72 of the valve means V and the tube 86. In the particular case illustrated, the tube 86 is engaged in a downwardly opening socket 88 in the body and is fixed thereto as by brazing or the like.

The lower end portion 35 of the body 32 and establishing the mounting means K is externally threaded and is adapted to be engaged in a suitable threaded opening 89 provided in the manifold M. A suitable lock nut 90 is provided on the threaded portion of the body 32 and engages the exterior of the manifold and locks the body in threaded engagement with the manifold.

With the above relationship of parts, it will be apparent that the tube 86 projects into the interior of the manifold M. In practice, the tube is formed of a malleable metal, as for instance, copper, and is bent or formed as clearly illustrated in Fig. 2 of the drawings so that it is free and projects into the intake port 10 for the cylinder 12a to which the unit P is related and in close proximity to the inlet side of the inlet valve 11 related thereto.

It will be apparent from the foregoing, that the units P of the apparatus that I provide can be easily applied to a conventional stock intake manifold by simply drilling and tapping each of the ducts 18 of the manifold to cooperatively receive the lower threaded portion of the bodies 32 of the units.

The nozzle N at the terminal end of the tube 86 is characterized by an annular seat ring 91 engaged in the outer end of the tube in fixed position therein, a conical valve member 92 engaging the outer side of the seat, an elongate valve stem 93 fixed to the valve member and projecting through the seat ring to the interior of the tube, a head 94 on the inner end of the stem, and a compression spring 95 between the head and the seat ring 91 and normally yieldingly urging the valve member into seated engagement on the ring.

With the above relationship of parts, it will be apparent that the nozzle N is a pressure release nozzle and normally prevents the flow of fuel from the tube into the intake port of the engine. It will be further apparent that when sufficient pressure is generated by the fuel to overcome the resistance established by the spring 95, as by actuation of the pump means A, the valve member 92 is unseated and a conical spray of fuel or gasoline is passed by the nozzle into the intake port.

In the form of the invention illustrated, the seat ring 91 of the nozzle N is shown engaged and fixed in the end of the tube 86 by suitably deforming the tube to receive the ring and then rolling or swaging a portion of the tube to hold the ring fixed therein. It is to be understood that in practice, the seat ring 91 in the nozzle N can be engaged with the tube 86 in any suitable manner and that the particular construction shown is only illustrative of one manner of carrying out the present invention.

The manually operable control means F operatively connecting the several pump units P and the throttle valve T is a simple linkage setup and is shown as including lever arms 96 and 97 fixed to the opposite ends of the shaft 23 carrying the butterfly valve member 22, an operating rod 98 fixed to one end of the lever arm 96 and adapted to be shifted to open and close the throttle valve T, elongate tie rods 99 and 100 extending longitudinally along each bank or row of pump units P and pivotally connected to the outer ends of the lever arms 80 of the adjacent pump units by suitably connecting blocks 101, or the like, and coupling rods 102 and 103 pivotally coupled to and extending between the lever arms 96 and 97 and the tie rods 99 and 100.

When the apparatus is applied to an automobile engine, the operating rod 98 can be coupled to a suitable pedal mechanism (not shown) to be engaged and shifted by a foot of the operator.

From the foregoing and from a study of Fig. 1 of the drawings, it will be apparent that when the operating rod 98 is shifted in the direction indicated by the arrow X, the throttle valve T is opened and the coupling and tie rods related to each bank of units P are shifted in the direction indicated by the arrows Y with the result that the lever arms 80 of the units are shifted out of engagement with the valve stems 76 and the needle valves 75 of the means V are shifted to an open position by action of the springs 78.

In practice, a suitable spring means is incorporated in the pedal means (not shown), which means normally urges and yieldingly holds the operating rod 98 in the direction indicated by the arrow W in Fig. 1 of the drawings and where the throttle valve is closed and where the operating arms 80 of the units P are shifted into engagement with the valve stems 76 of the units P to urge the needle valve 75 into their idling position.

It is to be understood that in practice, the means F can vary widely in construction and arrangement and that the particular means shown and described above is only illustrative of one carrying out of the invention.

The fuel supply means S adapted to deliver fuel from the pump 14 to the several units P is shown as including a U-shaped manifold 105 formed of tubing. The manifold is shown connected to the fuel pump 14 at the outlet and offset pump, said manifold having a leg 106 extending along or parallel with each bank of units P and as having lateral branches 107 extending between the legs and the fittings 69 carried by the jackets 64 and to which the flexible hoses 67 are connected.

The distributing means D adapted to energize the coils 54 of the units P is shown as including an annular commutator ring 110 having a plurality of circumferentially spaced contacts 111 extending from the inner to the outer peripheries of the ring, there being one contact for each unit P, a line 112 extending from each contact to its related unit P where it engages the fitting 54' of the unit, a rotor 113 driven by the engine E and engaged within the commutator ring, a brush 114 on the rotor and adapted to engage the contacts 111, and a current supply means to conduct current to the rotor and including a brush 115 carried by the ring 110 and engaging the rotor, and a supply line 116 conducting current from a suitable supply, as for instance a battery 117, to the brush 115.

In the particular case illustrated, the means D is shown related to the ignition distributor 15 of the engine E, which distributor is driven by and timed with the engine E in a conventional manner. The commutator ring 110 is shown as a simple annular ring of non-conductive material press fitted in and carried by the cap 118 of the ignition distributor 15. The rotor 113 is shown as a simple annular ring of conductive material engaged around and carried by the lower stem portion of the rotor 119 of the ignition distributor 15.

Figure 7:
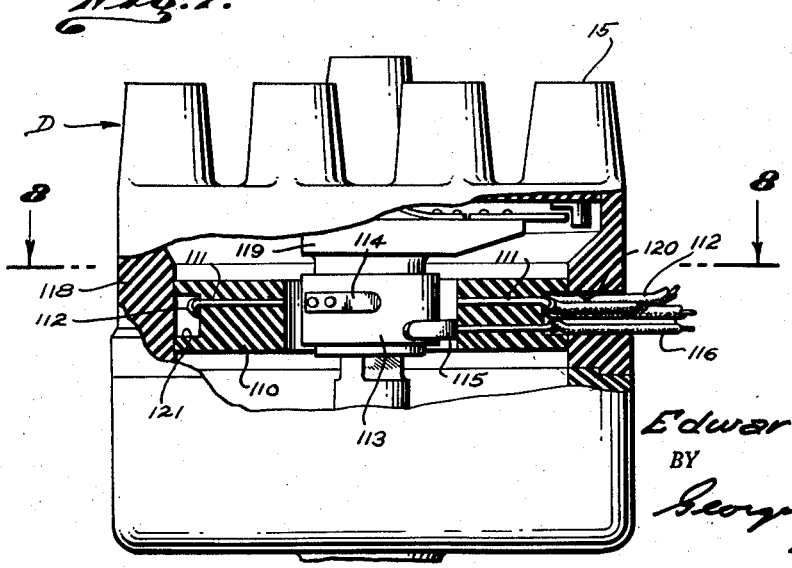
Fig. 7 is a sectional view of the distributor for the apparatus that I provide and showing it related to the ignition distributor for the engine.
Figure 3:
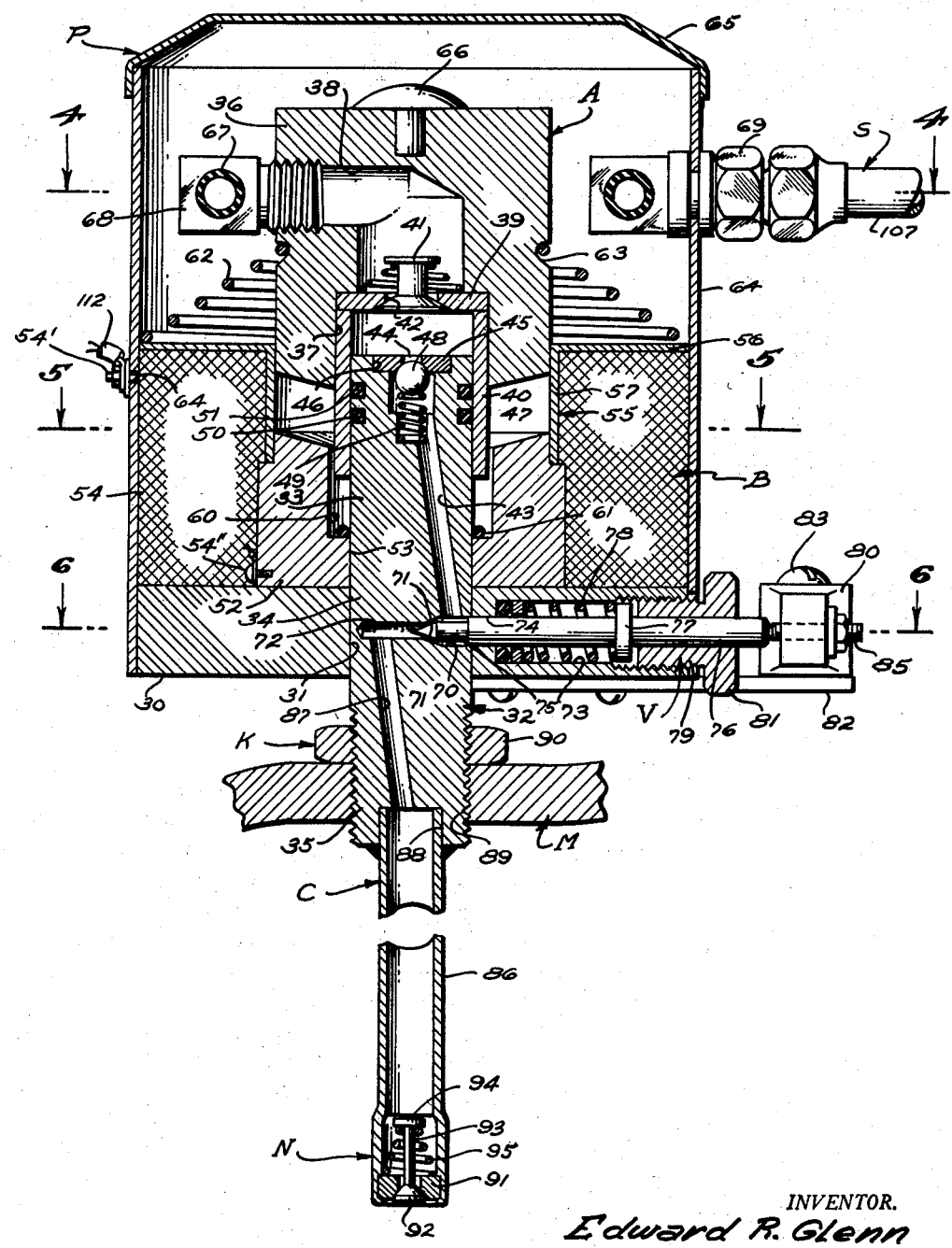
Fig. 3 is an enlarged detailed sectional view of an injector pump as provided by the present invention.
Figure 4:
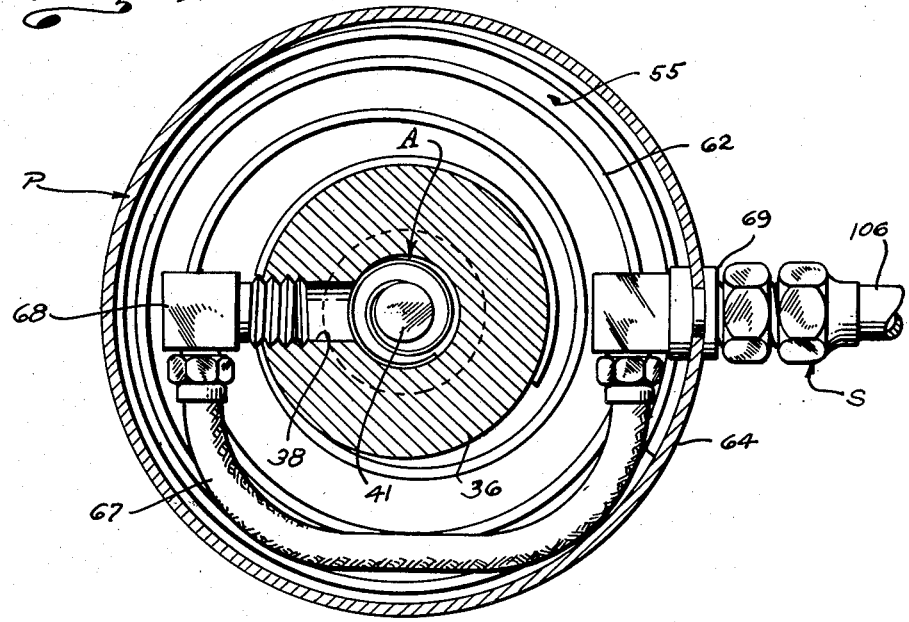
Fig. 4 is a transverse sectional view taken as indicated by line 4—4 on Fig. 3.
Figure 8:
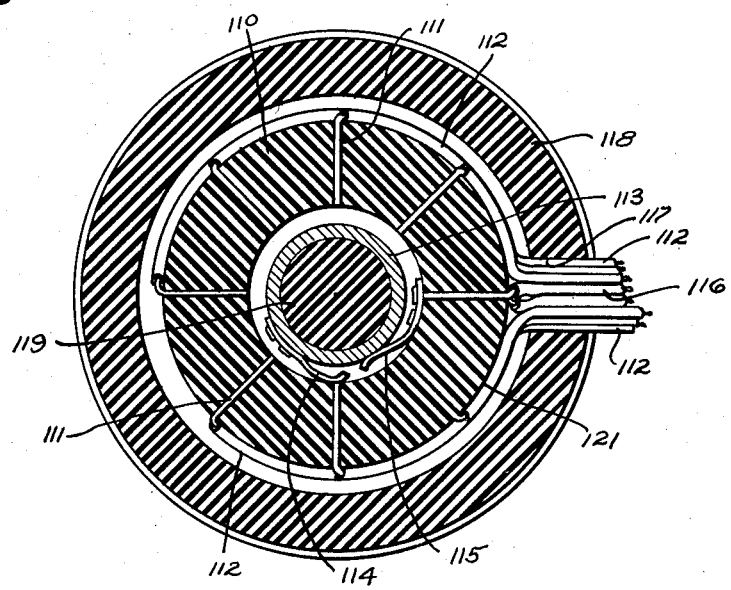
Fig. 8 is a sectional view taken as indicated by line 8—8 on Fig. 7.
Figure 5:
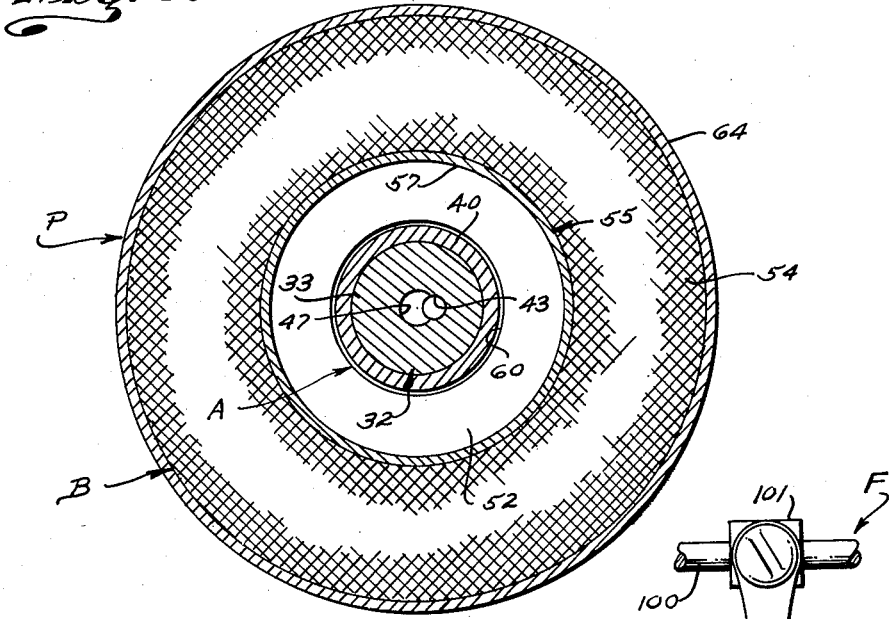
Fig. 5 is a transverse sectional view taken as indicated by line 5—5 on Fig. 3.
Figure 6:
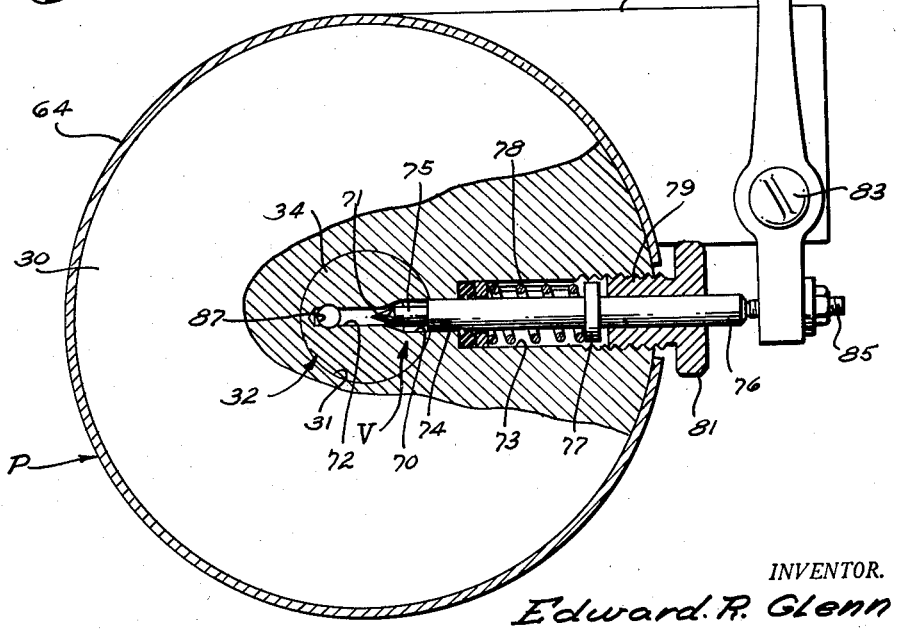
Fig. 6 is a transverse sectional view taken as indicated by line 6—6 on Fig. 3.

The lines 112 extending between the contacts 111 carried by the commutator ring and their related units P, and the supply line 116 extending from the battery 117 to the brush 115, extend through a suitable opening 120 provided in the side of the distributor cap 118 and in a suitable annular groove 121 about the exterior of the commutator ring 110, as clearly illustrated in Fig. 7 of the drawings. The brush 115 carried by the commutator ring is spaced below the brush 114 carried by the rotor so that they are free to rotate relative to each other. The brush 114 on the rotor is positioned circumferentially with the commutator ring so that contact is established between the brush 114 and the contacts 111 each time the inlet valves 11 related thereto are open.

In practice, the distributor means D can vary widely in form and construction without affecting the satisfactory operation of the apparatus. As for instance, the means D could be a separate distributor mechanism, that is, a mechanism similar to a conventional distributor separate and independent of the ignition distributor 15 for the engine.

With the structure set forth above, it will be apparent that the distributor means D timed with and driven by the engine serves to conduct current to and to actuate the several units P each time the inlet valves 11 of the engine E are opened to admit a charge of gasoline and air into cylinders 12 related thereto.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A fuel injecting apparatus for a gasoline operated internal combustion engine having a cylinder, an intake port for the cylinder and an inlet valve related to the port including, an air inlet manifold related to the cylinder and communicating with the port, a throttle valve related to and controlling the flow of air into the manifold, a fuel injector unit related to the manifold and including, an electrically operated pump means, metering valve means, and a nozzle extending into the manifold and communicating with the inlet port for the cylinder, fuel supply means delivering gasoline to the unit, electric distributing means timed with the engine and adapted to actuate the pump means of the unit each time the inlet valve for the cylinder is opened, and manually operable actuating means extending between the throttle valve and the metering valve means and controlling the volume and ratio of gasoline and air entering the engine.

2. A fuel injecting apparatus for a gasoline operated internal combustion engine having a plurality of cylinders, an intake port for each cylinder and an inlet valve related to each port and controlling the flow of air and fuel into the cylinder including, an air inlet manifold related to the several cylinders and communicating with the ports, a throttle valve related to and controlling the flow of air into the manifold, an injector unit for each cylinder and carried by the manifold at the exterior thereof and including, an electrically operated pump means, metering valve means, and a nozzle extending into the manifold and communicating with the inlet port, fuel supply means delivering gasoline to the several units, electric distributing means timed with the engine and adapted to actuate the pump means of each unit each time the inlet valve for the cylinder to which it is related is opened, and manually operable actuating means extending between the throttle valve and the metering valve means of the several units and controlling the volume and ratio of gasoline and air entering the engine.

3. A fuel injecting apparatus for a gasoline operated internal combustion engine having a plurality of cylinders, an intake port for each cylinder and an inlet valve related to each port and controlling the flow of air and fuel into the cylinder including, an air inlet manifold having a central inlet opening and a plurality of ducts communicating with inlet ports, a throttle valve related to the inlet opening and controlling the flow of air into the manifold, an injector unit for each cylinder and including, an electrically operated pump means, metering valve means, and a nozzle extending into the manifold duct communicating with the cylinder to which the unit is related, fuel supply means delivering gasoline to the several units, electric distributing means timed with the engine and adapted to energize and actuate the pump means of each unit each time the inlet valve for the cylinder to which it is related is opened, and manually operable actuating means extending between the throttle valve and the metering valve means of the several units and controlling the volume and ratio of gasoline and air entering the engine.

4. In combination, a gasoline operated internal combustion engine having a cylinder, an inlet port for the cylinder and an inlet valve controlling the flow of air and gasoline into the cylinder, an air intake manifold related to the inlet port, a throttle valve related to the manifold and controlling the flow of air into the cylinders, a fuel injector unit, said unit including an elongate body engaged in and carried by the manifold and projecting outwardly therefrom, a solenoid actuated pump means at the outer end of the body, a fuel conducting tube at the other end of the body and extending through the manifold and entering the inlet port, a pressure release nozzle at the end of the tube, and metering valve means carried by the body between the pump means and the fuel conducting tube and controlling the flow of gasoline from the pump means to the nozzle, fuel supply means delivering gasoline to the unit, electric distributing means timed with the engine and adapted to energize the pump means each time the inlet valve is open, and manually operable control means operatively connecting the throttle valve and the metering valve means to control the volume and ratio of gasoline and air entering the cylinder.

5. In combination, a gasoline operated internal combustion engine having a plurality of cylinders, an inlet port for each cylinder and an inlet valve related to each inlet port and controlling the flow of air and gasoline into the cylinder, an air intake manifold related to the engine and having a control inlet opening and a duct extending from said opening and communicating with each inlet port, a throttle valve related to the inlet opening in the manifold and controlling the flow of air through the manifold and into the cylinders, a fuel injector unit related to each cylinder, each unit including an elongate body engaged in a duct of the manifold and projecting outwardly therefrom, a solenoid actuated pump means at the outer end of the body, a fuel conducting tube at the other end of the body and extending through the duct and entering the inlet port related thereto, a pressure release nozzle at the end of the tube, and metering valve means carried by the body between the pump means and the fuel conducting tube and controlling the flow of gasoline from the pump means to the nozzle, fuel supply means conducting gasoline to the several units, electric distributing means timed with the engine and adapted to energize the pump means of the several units each time the inlet valve related thereto is open, and manually operable control means operatively connecting the throttle valve and the metering valves of the several units to control the volume and ratio of gasoline and air entering the engine.

6. In combination, a gasoline operated internal combustion engine having a plurality of cylinders, an inlet port for each cylinder and an inlet valve related to each inlet port and controlling the flow of air and gasoline into the cylinder, an air intake manifold related to the engine and having a central inlet opening and a duct extending from said opening and communicating with each inlet port, a throttle valve related to the inlet opening in the manifold and controlling the flow of air through the manifold and into the cylinders, a fuel injector unit related to each cylinder, each unit including an elongate body engaged in a duct of the manifold and projecting outwardly therefrom, a solenoid actuated cylinder and piston pump means at the outer end of the body, a fuel conducting tube at the other end of the body and extending through the duct and entering the inlet port related thereto, a spring loaded pressure release nozzle at the end of the tube, and a needle valve carried by the body between the pump means and the fuel conducting tube and controlling the flow of gasoline from the pump means to the nozzle, fuel supply means delivering gasoline to the pump means of the several units, electric distributing means timed with the engine and adapted to energize the pump means of the several units each time the inlet valve related thereto is open, and manually operable control means operatively connecting the throttle valve and the needle valves of the several units to control the volume and ratio of gasoline and air entering the engine.

References Cited in the file of this patent

UNITED STATES PATENTS

| 1,551,731 | Charter | Sept. 1, 1925 |
| 2,310,773 | Fuscaldo | Feb. 9, 1943 |
| 2,332,909 | Fuscaldo | Oct. 26, 1943 |
| 2,410,782 | Fuscaldo | Nov. 5, 1946 |
| 2,598,754 | Booth | June 3, 1952 |

FOREIGN PATENTS

| 971,274 | France | July 5, 1950 |